(12) United States Patent
Abrams et al.

(10) Patent No.: US 8,713,063 B2
(45) Date of Patent: Apr. 29, 2014

(54) METHOD AND SYSTEM FOR AUTOMATICALLY HIDING IRRELEVANT PARTS OF HIERARCHICAL STRUCTURES IN COMPUTER USER INTERFACES

(75) Inventors: Steven R. Abrams, New City, NY (US); Ian David Simmonds, Dobbs Ferry, NY (US); John Vlissides, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 522 days.

(21) Appl. No.: 11/034,951

(22) Filed: Jan. 13, 2005

(65) Prior Publication Data
US 2006/0155746 A1    Jul. 13, 2006

(51) Int. Cl.
*G06F 7/00* (2006.01)
*G06F 17/30* (2006.01)

(52) U.S. Cl.
USPC ............................ 707/797; 707/754; 707/798

(58) Field of Classification Search
USPC ........... 707/100, 754, 797, 798; 715/514, 765
See application file for complete search history.

(56) References Cited

U.S. PATENT DOCUMENTS

| | | | | |
|---|---|---|---|---|
| 5,414,809 | A * | 5/1995 | Hogan et al. ................... | 715/765 |
| 5,515,487 | A * | 5/1996 | Beaudet et al. ............... | 345/440 |
| 5,644,740 | A * | 7/1997 | Kiuchi ......................... | 715/853 |
| 6,381,611 | B1 * | 4/2002 | Roberge et al. ............... | 707/797 |
| 6,484,190 | B1 * | 11/2002 | Cordes et al. ................. | 715/514 |
| 2001/0045952 | A1 * | 11/2001 | Tenev et al. ................... | 345/440 |
| 2004/0122789 | A1 * | 6/2004 | Ostertag et al. .................. | 707/1 |
| 2004/0243938 | A1 * | 12/2004 | Weise et al. .................... | 715/526 |
| 2005/0134589 | A1 * | 6/2005 | Heer et al. ..................... | 345/440 |
| 2006/0041661 | A1 * | 2/2006 | Erikson et al. ................. | 709/225 |

OTHER PUBLICATIONS

Cormen et al. "Introduction to Algorithms," Twenty fourth printing, 2000, pp. 93-96.*

* cited by examiner

*Primary Examiner* — Shew-Fen Lin
(74) *Attorney, Agent, or Firm* — Michael J. Buchenhorner; Vazken Alexanian (57) ABSTRACT

The invention broadly and generally provides, in a computer-controlled display, a method of simplifying a graphical representation of a set of connected nodes comprising the steps of: (a) selecting a subset of the aforesaid set; and (b) under computer program control, hiding representations of all nodes except (i) nodes within the aforesaid subset and (ii) at least one node having a defined relationship to the aforesaid subset.

21 Claims, 9 Drawing Sheets

METHOD AND SYSTEM FOR AUTOMATICALLY HIDING IRRELEVANT PARTS OF HIERARCHICAL STRUCTURES IN COMPUTER USER INTERFACES

FIELD OF THE INVENTION

The present invention relates to a novel method of reducing inadvertent clutter within complex graphical representations in a computer graphical user interface.

BACKGROUND OF THE INVENTION

A great many user interfaces for computer systems display complex information structures in graphical representations of sets of connected nodes which may be in either a hierarchical, tree-like manner, or as a graph consisting of nodes and connections. Commonly owned U.S. Pat. No. 6,816,175 relates to means and a method executable by a computer system for navigation within a tree structure with leaf nodes representing arbitrary types of objects. Today, there are many commercially available programs and program components which permit navigation of hierarchical data. For example, the JTree component which is included as part of the Java Foundation Classes (offered by Sun Microsystems of Santa Clara, Calif.) enables a programmer to display hierarchical information in a cascading tree structure. Similarly the Microsoft Foundation Classes include a tree component which is used in many applications based on the Windows Operating System including the Windows Explorer file manager included in Windows XP (distributed by Microsoft Corporation, One Microsoft Way, Redmond, Wash. 98052-6399).

In the case of trees, a style of selective display has emerged in which users selectively display and hide parts of the tree. This is particularly important when the information structures being displayed are of a considerable or even moderate size. In a technique used in the aforementioned Windows Explorer and related applications, each node in the tree may be either closed or expanded. At any one moment in time, the only parts of the tree being displayed are those that were either initially visible (when the tree was first displayed) or subsequently expanded, and that have not subsequently been closed. Further, any given node is visible at any moment in time if and only if each of its ancestors in the hierarchy is expanded at that moment.

This technique benefits the user in that it requires her to see only those portions of the information structure in which she is interested at any moment in time, thus reducing visual clutter. As her attention switches to other parts of the structure, the user may "collapse" parts that she is done with, and expand parts that merit her further attention.

This technique also offers performance advantages, since the program need only construct for display graphical elements corresponding to the nodes of the tree that the user wishes to view. For example, the tree may need only display a few hundred of the potentially hundreds of thousands of files and directories on a file system. Such a "lazy construction" of the graphical representation, and exploration of the data that is being displayed, can lead to dramatic improvements in display time.

After exploring the information structures for a while using such an interface, a user is typically left with a great many partially expanded tree branches. Although much of the tree may still be hidden, those branches that were expanded earlier can be even more distracting than if the tree were fully expanded. The very fact that these branches are expanded draws attention to them, and the user can become frustrated looking at things that are no longer of interest. Consequently the user becomes faced with the task of manually selecting and closing those things that are no longer of interest, leaving only those that are of interest.

SUMMARY OF THE INVENTION

The invention broadly and generally provides, in a computer-controlled display, a method of simplifying a graphical representation of a set of connected nodes comprising the steps of: (a) selecting a subset of the aforesaid set; and (b) under computer program control, hiding representations of all nodes except (i) nodes within the aforesaid subset and (ii) at least one node having a defined relationship to the aforesaid subset.

According to one preferred embodiment, the aforesaid defined relationship may be defined by: (a) each node which is directly connected to any node within the aforesaid subset has the aforesaid relationship; or (b) each node which is directly connected to any two nodes within the aforesaid subset has the aforesaid relationship. As should be understood, the invention may be applied whether or not the aforesaid subset consists of nodes which are serially connected to form a single path.

Another preferred embodiment of the invention provides the aforesaid method, wherein the aforesaid graphical representation comprises a tree structure characterized by: (a) a root node; (b) one and only one path connecting to the root node from any other node; (c) wherein, when two nodes occur on a single path ending at the root node, the node which is closest to the root node is an ancestor of the other node; (d) wherein, when two nodes occur on a single path ending at the root node, the node which is furthest from the node root is a descendant of the other node; and (e) wherein, when two descendant nodes have direct and independent paths to the same ancestor node, the two descendant nodes are siblings of each other. In this embodiment, the aforesaid defined relationship may be defined as: (a) each node which is a descendant of any node within the aforesaid subset has the aforesaid relationship; and (b) each node which is an ancestor of any node within the aforesaid subset has the aforesaid relationship. Alternatively, the aforesaid defined relationship could be defined as: (a) each node which is a descendant of any node within the aforesaid subset has said relationship; (b) each node which is an ancestor of any node within the aforesaid subset has the aforesaid relationship; and (c) each node which is a sibling of any node within the aforesaid subset has the aforesaid relationship. Additional embodiments may define the aforesaid relationship to include siblings of ancestors.

The invention further broadly and generally provides a system of simplifying a graphical representation of a set of connected nodes, the aforesaid system comprising: (a) a selection device operable to select a subset of the aforesaid set; (b) a hiding device operable to hide representations of all nodes except (i) nodes within the aforesaid subset and (ii) at least one node having a defined relationship to the aforesaid subset.

According to one preferred embodiment, the aforesaid defined relationship may be defined by: (a) each node which is directly connected to any node within the aforesaid subset has the aforesaid relationship; or (b) each node which is directly connected to any two nodes within the aforesaid subset has the aforesaid relationship. As should be understood, the invention may be applied whether or not the aforesaid subset consists of nodes which are serially connected to form a single path.

According to another preferred embodiment, the aforesaid graphical representation comprises a tree structure characterized by: (a) a root node; (b) one and only one path connecting to the root node from any other node; (c) wherein, when two nodes occur on a single path ending at the root node, the node which is closest to the root node is an ancestor of the other node; (d) wherein, when two nodes occur on a single path ending at the root node, the node which is furthest from the node root is a descendant of the other node; and (e) wherein, when two descendant nodes have direct and independent paths to the same ancestor node, the two descendant nodes are siblings of each other. In this embodiment, the aforesaid defined relationship may be defined as: (a) each node which is a descendant of any node within the aforesaid subset has the aforesaid relationship; and (b) each node which is an ancestor of any node within the aforesaid subset has the aforesaid relationship. Alternatively, the aforesaid defined relationship could be defined as: (a) each node which is a descendant of any node within the aforesaid subset has the aforesaid relationship; (b) each node which is an ancestor of any node within the aforesaid subset has the aforesaid relationship; and (c) each node which is a sibling of any node within the aforesaid subset has the aforesaid relationship. Additional embodiments may define the aforesaid relationship to include siblings of ancestors.

The invention further broadly and generally provides a program storage device readable by a digital processing apparatus and having a program of instructions which are tangibly embodied on the aforesaid program storage device and which are executable by the aforesaid digital processing apparatus to perform a method of simplifying a graphical representation of a set of connected nodes, the method comprising: (a) selecting a subset of the aforesaid set; and (b) hiding representations of all nodes except (i) nodes within the aforesaid subset and (ii) at least one node having a defined relationship to the aforesaid subset.

According to one preferred embodiment, the aforesaid defined relationship may be defined by: (a) each node which is directly connected to any node within the aforesaid subset has the aforesaid relationship; or (b) each node which is directly connected to any two nodes within the aforesaid subset has the aforesaid relationship. As should be understood, the invention may be applied whether or not the aforesaid subset consists of nodes which are serially connected to form a single path.

In another preferred embodiment, the aforesaid graphical representation comprises a tree structure characterized by: (a) a root node; (b) one and only one path connecting to the root node from any other node; (c) wherein, when two nodes occur on a single path ending at the root node, the node which is closest to the root node is an ancestor of the other node; (d) wherein, when two nodes occur on a single path ending at the root node, the node which is furthest from the node root is a descendant of the other node; and (e) wherein, when two descendant nodes have direct and independent paths to the same ancestor node, the two descendant nodes are siblings of each other. In this embodiment, the aforesaid defined relationship may be defined as: (a) each node which is a descendant of any node within the aforesaid subset has the aforesaid relationship; and (b) each node which is an ancestor of any node within the aforesaid subset has the aforesaid relationship. Alternatively, the aforesaid defined relationship could be defined as: (a) each node which is a descendant of any node within the aforesaid subset has the aforesaid relationship; (b) each node which is an ancestor of any node within the aforesaid subset has the aforesaid relationship; and (c) each node which is a sibling of any node within the aforesaid subset has the aforesaid relationship. Additional embodiments may define the aforesaid relationship to include siblings of ancestors.

DETAILED DESCRIPTION OF PREFERRED EMBODIMENTS

Figure 1:
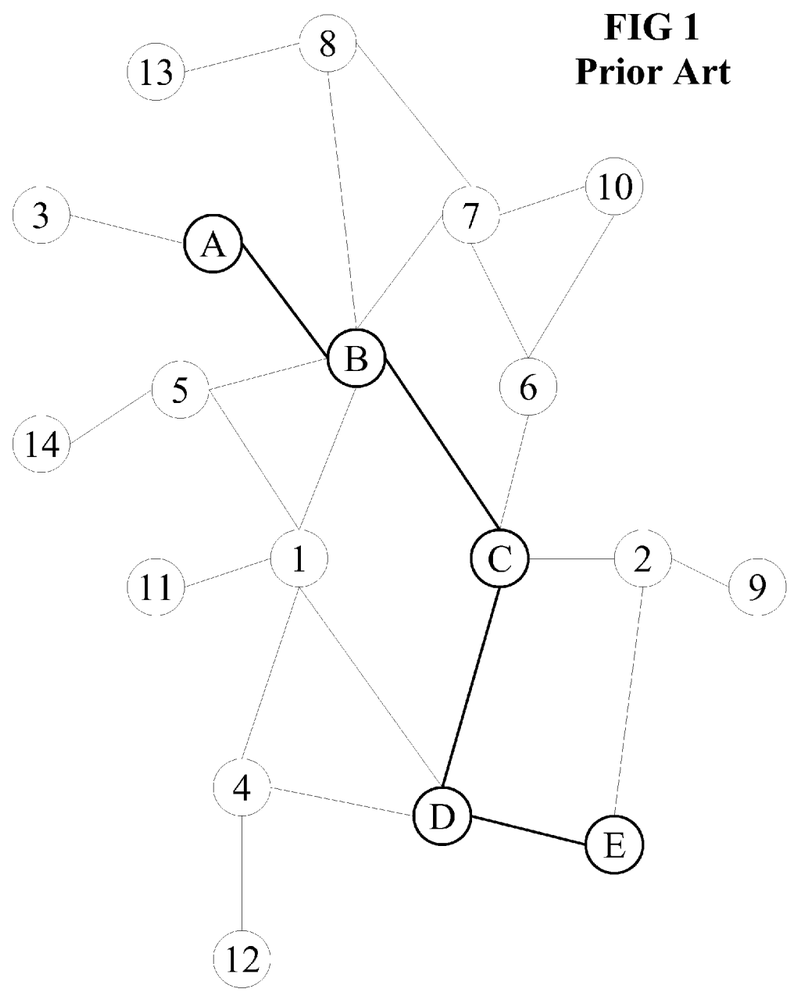
FIG. 1 shows a set of connected nodes which will be modified by the invention. Selected nodes A-E are represented by bold circles and a path between the selected nodes is represented by bold lines.

FIG. 1 shows an exemplary prior art graphical representation of a set of connected nodes (A-E and 1-14) which can advantageously be simplified according to the invention. Typically, this graphical representation is displayed on a CRT, LCD or other display under computer control by a computer program (e.g. the JTree component, herein above).

Figure 2:
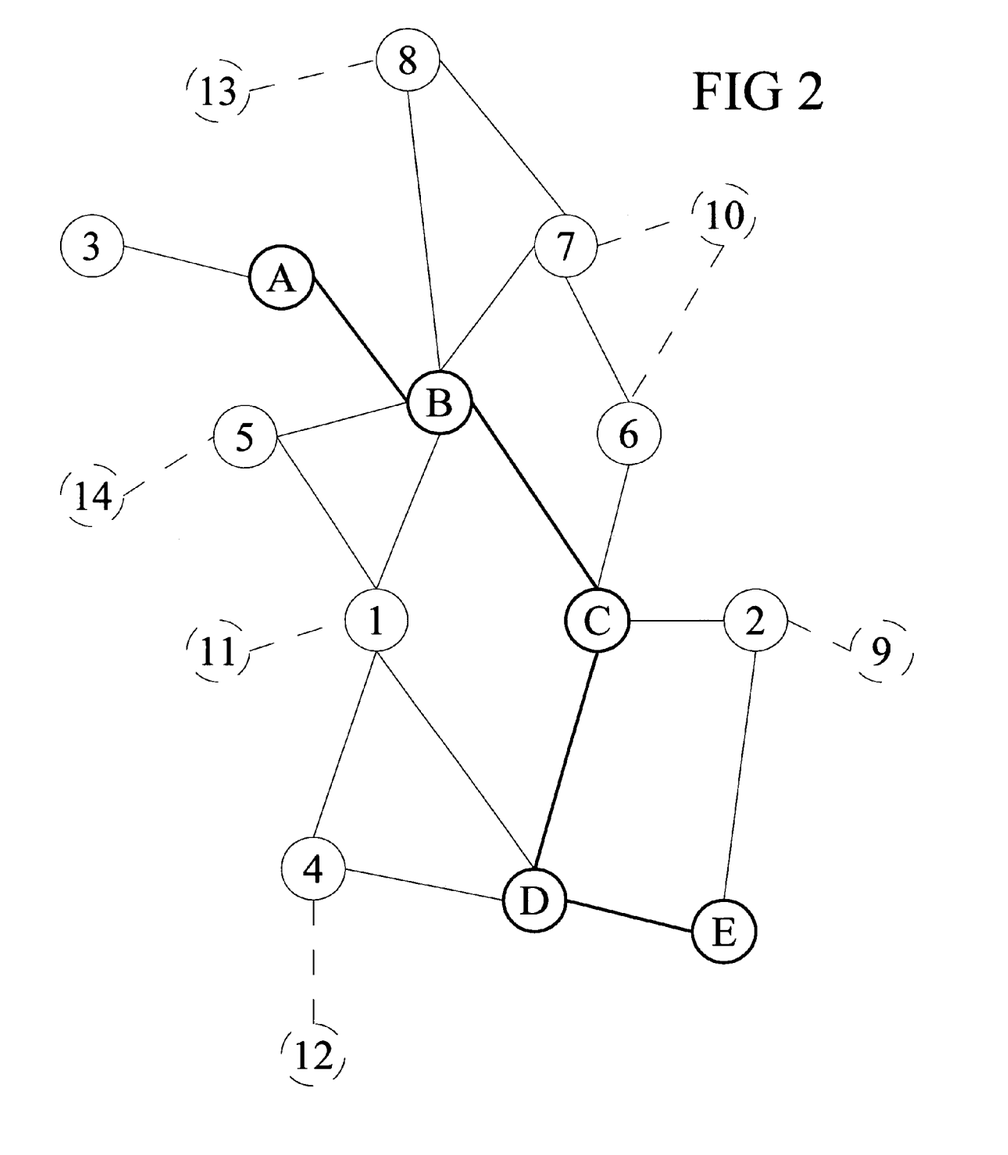
FIG. 2 shows a the set of connected nodes from FIG. 1 following one embodiment of the invention. After this embodiment of the invention, nodes 9-14 (shown in dashed lines) would not be displayed, simplifying the representation of the set of nodes.

FIG. 2 shows a graphical representation of a set of connected nodes that has been simplified according to one embodiment of the invention. The dotted lines represent nodes 9-14 and their connections that are not displayed as a result of the invention.

According to the invention, a subset of nodes (A, B, C, D, and E) are selected. In this embodiment, the subset A-E consists of nodes which are serially connected to form a single path. Then, a defined relationship of other nodes to these 5 nodes is chosen. In the case of FIG. 2, the defined relationship is characterized by nodes which are connected to nodes A, B, C, D, or E directly, rather than through an intervening node. Thus, nodes with this defined relationship include nodes 1-8, while nodes 9-14 are excluded.

In order to effect the desired hiding of nodes 9-14, the aforesaid computer program is provided with suitable computer instructions that permit display of only nodes A-E, and the nodes 1-8, and the connections there between in known manner.

Figure 3:
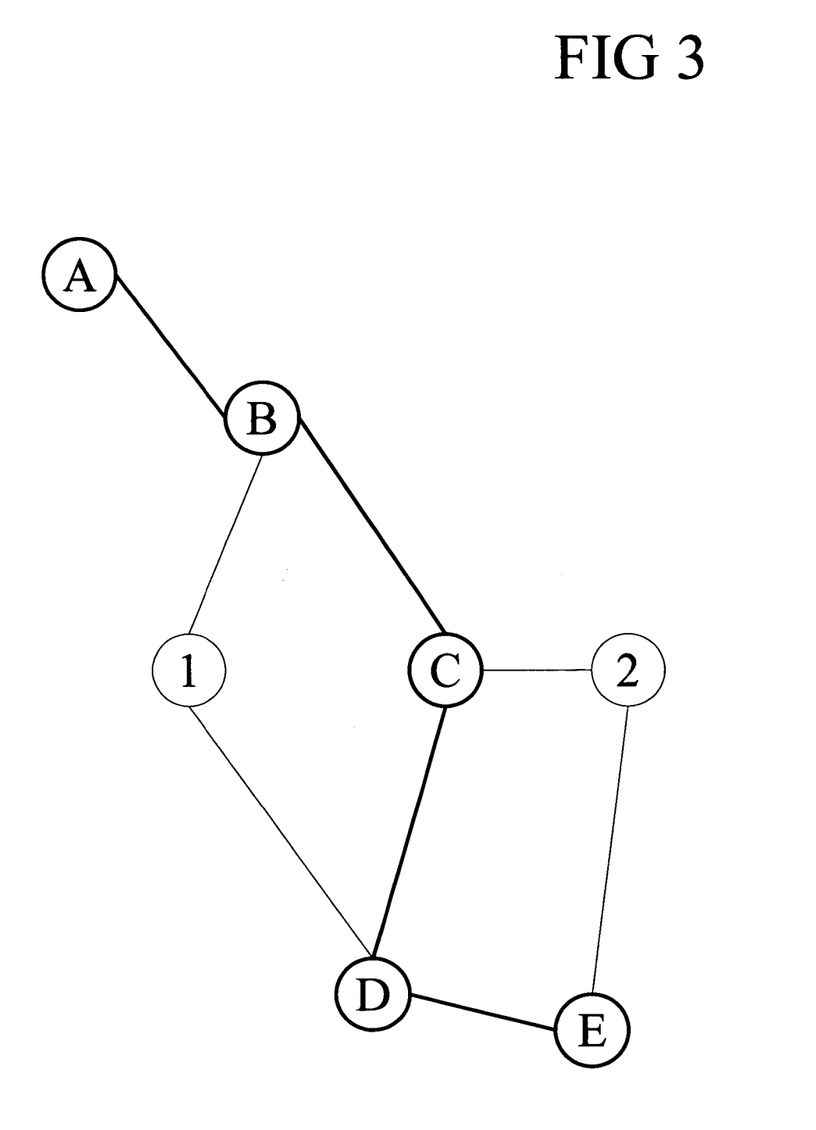
FIG. 3 shows the set of connected nodes from FIG. 1 following a more aggressive simplification than shown in FIG. 2. Nodes 3-14 are not displayed.

In similar fashion, the "selected subset" of FIG. 3 comprises nodes A-E, while the "defined relationship" is characterized by nodes 1 and 2, which are connected to at least 2 of nodes A, B, C, D, or E. Thus FIG. 3 simplifies the graphical representation shown in FIG. 1 by displaying only nodes A, B, C, D, E, 1, 2 and their interconnections, while hiding nodes 3-14 and all connected thereto.

Figure 4:
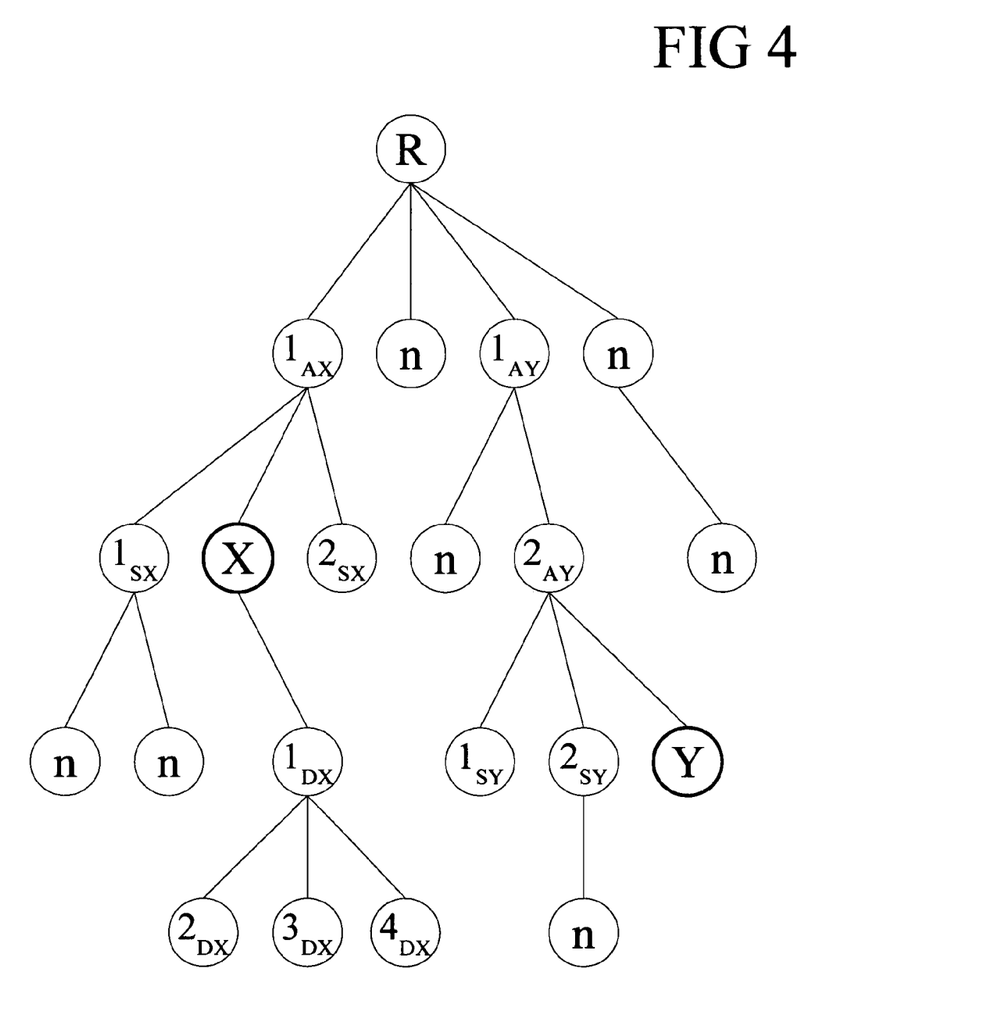
FIG. 4 shows a set of connected nodes which form a tree structure. Nodes are labeled to indicate relationships to nodes within a selected subset X and Y, which are represented by bold circles.
Figure 7:
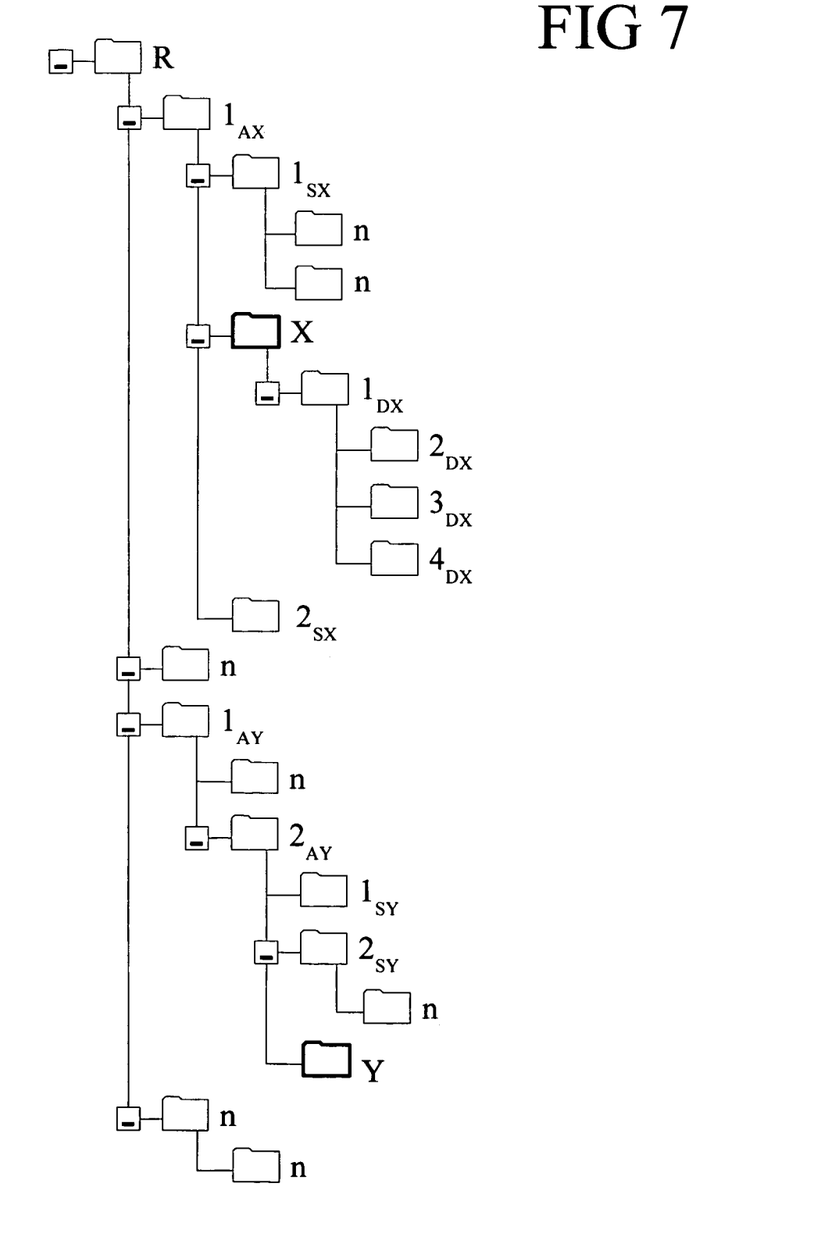
FIG. 7 shows the set of connected nodes from FIG. 4, but displayed in a typical display style for tree structures wherein node information is presented horizontally.
Figure 8:
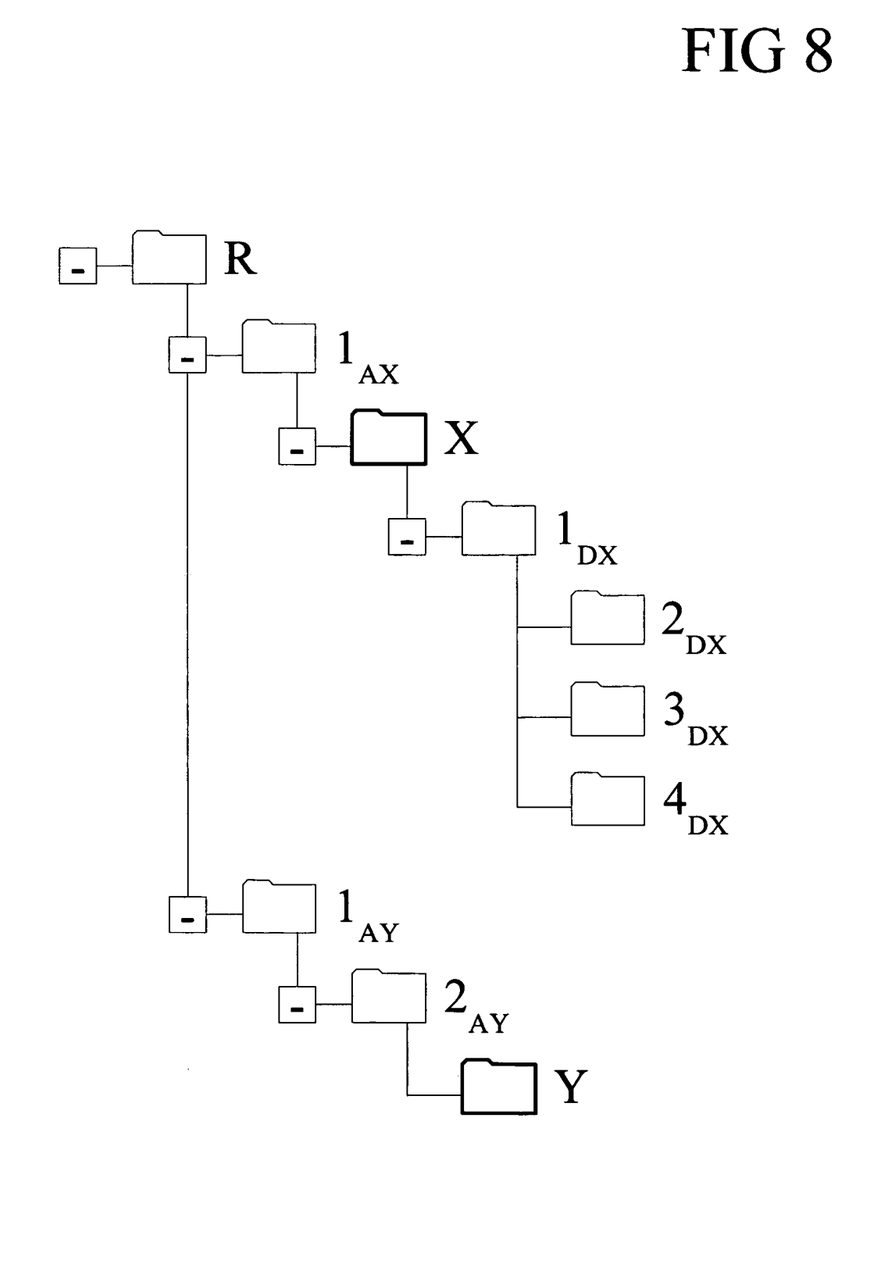
FIG. 8 shows the set of connected nodes from FIG. 4, simplified as in FIG. 6, and presented in the style of FIG. 7.

According to other embodiments of the invention, simplification may be carried out for graphical representations which are tree structures, as typified by the prior art tree structure of FIG. 4. The tree structure in FIG. 4 is commonly presented in the form shown in FIG. 7, where the information for each node is presented horizontally. Tree structures representations in this form may be generated by computer software such as the JTree component of the Java Foundation Classes (distributed by Sun Microsystems of Santa Clara, Calif.).

As can be seen, FIG. 4-9 includes a root node R. As will be understood, there is one and only one path connecting from the root node R to any other node of FIG. 4. On such a path, all nodes which are closer to the root node are considered ancestors of nodes which are more distant from the root node. For example, in FIGS. 4-9, node $1_{AX}$ is an ancestor of node X. Because the root node R is an ancestor of all other nodes, node X has a total of 2 ancestors. Nodes farther from the root node R are considered descendants of nodes on the same path which are closer to the root node R. In FIGS. 4-9, nodes $1_{DX}$, $2_{DX}$, $3_{DX}$, and $4_{DX}$ are all descendants of node X. Descendant nodes which are directly connected to the same ancestor node are considered siblings of each other. In FIGS. 4, 5, 7, and 9, nodes $1_{SY}$, $2_{SY}$, and Y are all directly connected to a common ancestor $2_{AY}$. Therefore nodes $1_{SY}$ and $2_{SY}$ are siblings of node Y.

Figure 5:
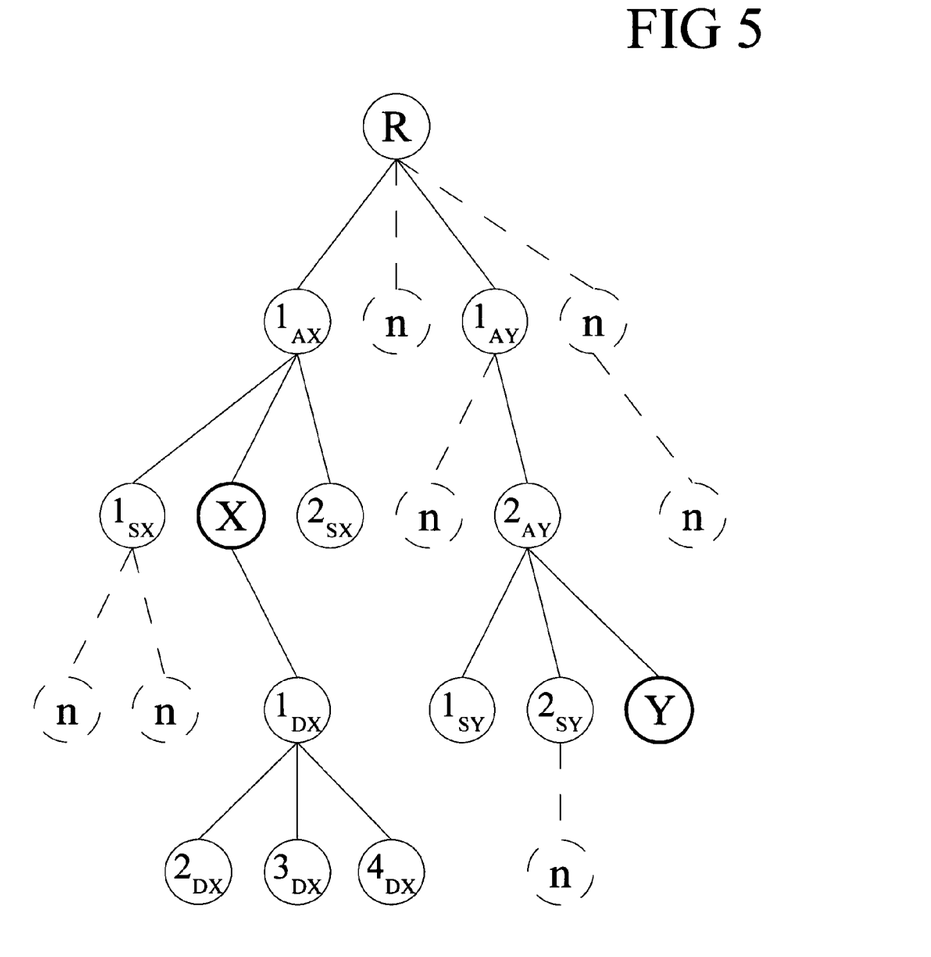
FIG. 5 shows the set of connected nodes from FIG. 4 following a simplification in accordance with the present invention. Nodes which do not have a defined relationship to nodes within the selected subset are displayed in dotted lines to indicate that they would be hidden.
Figure 6:
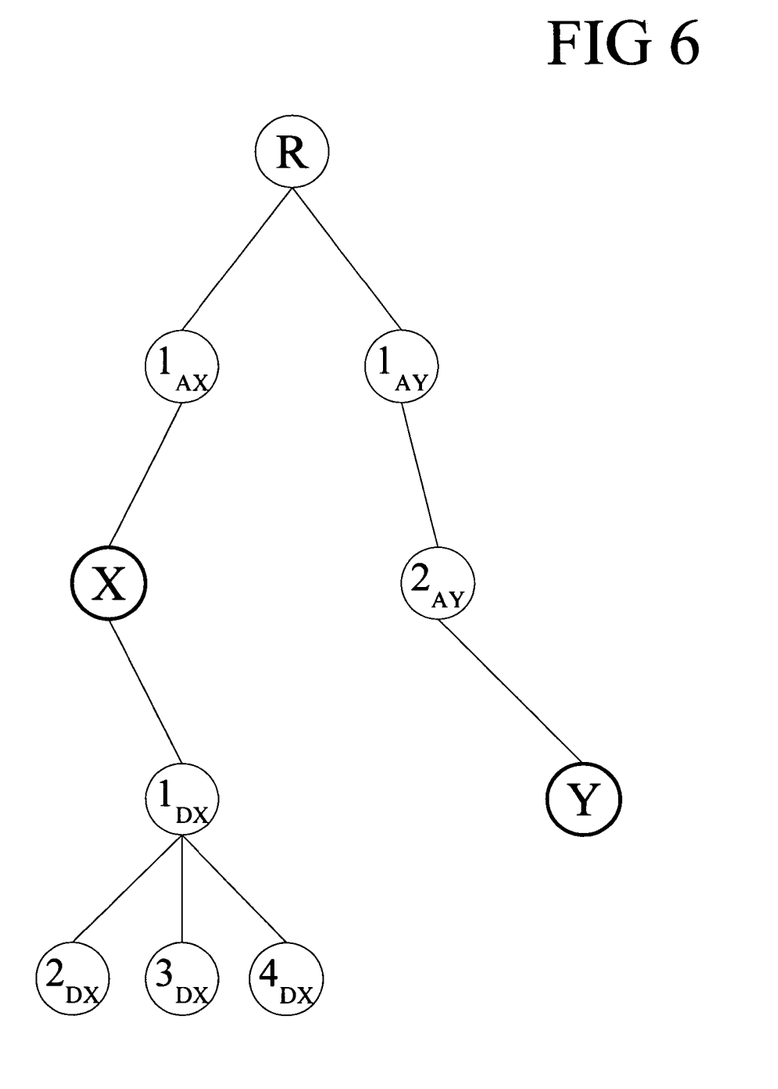
FIG. 6 shows the set of connected nodes from FIG. 4 following a more aggressive simplification than shown in FIG. 5. Siblings of nodes X and Y are not displayed.

To simplify the prior art tree of FIG. 4 according to the invention, a subset consisting of node X and node Y is first selected. Then a defined relationship is chosen. In this case, the defined relationship is characterized by the ancestors, descendants, and siblings of the selected subset X, Y. Thus, the defined relationship includes nodes R, $1_{AX}$, $1_{SX}$, $2_{SX}$, $1_{DX}$, $2_{DX}$, $3_{DX}$, $4_{DX}$, $1_{AY}$, $2_{AY}$, $1_{SY}$, and $2_{SY}$. In order to simplify and reduce visual clutter in the observable tree structure, the computer program is modified in a well-known manner to display only nodes X, Y, R, $1_{AX}$, $1_{SX}$, $2_{SX}$, $1_{DX}$, $2_{DX}$, $3_{DX}$, $4_{DX}$, $1_{AY}$, $2_{AY}$, $1_{SY}$, and $2_{SY}$ and connections there between, as shown in FIG. 5. Another embodiment could define a relationship such that siblings of nodes within the selected subset are not displayed, as in FIGS. 6 and 8. Here, the computer would display only nodes X, Y, R, $1_{AX}$, $1_{DX}$, $2_{DX}$, $3_{DX}$, $4_{DX}$, $1_{AY}$, and $2_{AY}$ (not displaying nodes $1_{SX}$, $2_{SX}$, $1_{SY}$, and $2_{SY}$).

Figure 9:
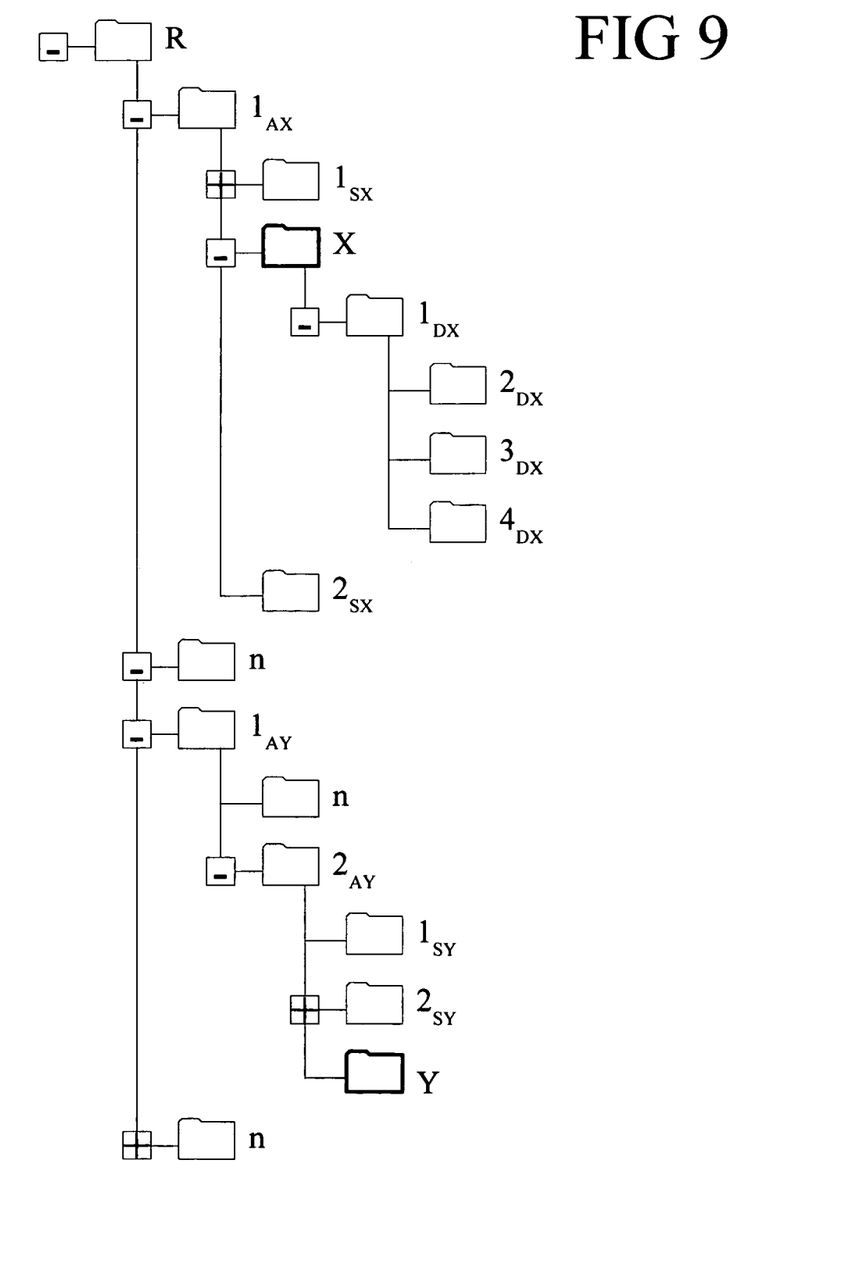
FIG. 9 shows a representation of the set of connected nodes from FIG. 4 in the display style of FIG. 7 following a simplification in accordance with the present invention.

In another embodiment, the defined relationship is characterized by siblings of all ancestors of nodes within the selected subset, in addition to the selected nodes, and selected node siblings, ancestors, and descendants. The resulting structure is shown in FIG. 9. This embodiment may conveniently be called a "collapse around" with respect to nodes X and Y because representations for the hidden nodes have been collapsed into the representations of visible ancestors in known manner.

As will be understood, a novel system for carrying out the novel methods described herein above may comprise a programmed computer comprising functional components thereof including a selection device operable to select a subset of the set of nodes being graphically represented and a hiding device operable to hide representations of all nodes except nodes within a selected subset and nodes having a defined relationship to nodes within a selected subset.

The program storage device according to the invention is readable by a digital processing apparatus and having a program of instructions which are tangibly embodied on the storage device and which are executable by the aforesaid digital processing apparatus to perform the aforesaid method of simplifying a graphical representation of a set of connected nodes. Such a program storage device may, for example, comprise a magnetic disk, a flash storage card, or the like.

While changes and variations to the embodiments may be made by those skilled in the field of computer-controlled graphical representations, the scope of the invention is to be determined by the appended claims.

What is claimed is:

1. A method of simplifying a graphical representation of a set of connected nodes, said method comprising the steps of:
    under computer control:
        presenting the set of connected nodes in a computer-controlled display;
        receiving from a user a selection of a first subset of nodes of interest to said user from said set of connected nodes;
        wherein all nodes from the set of connected nodes that are not included in the first subset comprise a secondary set;
        receiving from the user a defined relationship specifying how at least one node in the secondary set is connected to at least one node in said first subset, wherein said connectedness is a link relationship selected from a group consisting of:
            a) a node in the secondary set which is a descendant of a node in the first subset;
            b) a node in the secondary set which is an ancestor of a node in the first subset;
            c) a node in the secondary set which is a sibling of a node in the first subset; and
            d) a node in the secondary set which is the sibling of the ancestor of a node in the first subset;
        selecting a third subset of nodes from the set of the connected nodes, based on the defined relationship provided by the user, wherein said third subset comprises:
            nodes within the first subset;
            at least one node from the secondary set having the defined relationship to the at least one node in the first subset; and
            interconnections among the nodes within the first subset and the at least one node from the secondary set having the defined relationship to the at least one node in said first subset;
        displaying only the third subset of nodes including the interconnections; and
        hiding any nodes not in the third subset, thereby producing a simplified version of said graphical representation of said set of connected nodes in said computer-controlled display;
        wherein the graphical representation comprises a tree structure comprising: a root node; the nodes from the third subset; and a single path connecting any of the nodes in the third subset to the root node;
    wherein, when two nodes occur on the single path ending at the root node, the node closest to the root node is an ancestor of the other node, and the node furthest from the root node is a descendant of the other node.

2. The method as set forth in claim 1, wherein said defined relationship is defined as:
    each node from the secondary set which is the descendant of any node within said first subset; and each node from the secondary set which is the ancestor of any node within said first subset.

3. The method as set forth in claim 2, wherein said defined relationship is further defined as: each node from the secondary set which is the sibling of any node within said first subset.

4. The method as set forth in claim 3, wherein said defined relationship is further defined as: each node from the secondary set which is the sibling of the ancestor of any node within said first subset.

5. The method as set forth in claim 1, wherein said defined relationship is defined as: each node from the secondary set which is directly connected to any node within said first subset.

6. The method as set forth in claim 5, wherein said defined relationship is further defined as: each node from the secondary set which is directly connected to any two nodes within said first subset.

7. A system for simplifying a graphical representation of a set of connected nodes, said system comprising:
 a display interface displaying the set of connected nodes;
 a user interface receiving from a user:
  a selection of a first subset of nodes of interest to the user from the set of connected nodes;
  wherein all nodes from the set of connected nodes that are not included in the first subset comprise a secondary set; and
  a defined relationship of at least one node from the secondary set to the nodes in the first subset, wherein the defined relationship specifies how the nodes are connected, wherein said connectedness is a link relationship selected from a group consisting of:
   a) a node in the secondary set which is a descendant of a node in the first subset;
   b) a node in the secondary set which is an ancestor of a node in the first subset;
   c) a node in the secondary set which is a sibling of a node in the first subset; and
   d) a node in the secondary set which is the sibling of the ancestor of a node in the first subset;
 a programmable computing device performing:
  selecting a third subset of nodes from the set of the connected nodes, based on the defined relationship provided by the user, said third subset comprising:
   nodes from the first subset;
   at least one node from the secondary set having the defined relationship to the at least one node in the first subset; and
   interconnections among the nodes within the first subset and the at least one node from the secondary set having the defined relationship to the at least one node in said first subset; and
  de-selecting any nodes not belonging to the third subset;
 the display interface further performing:
  displaying only the third subset of nodes including the interconnections, as a graphical representation; and
  hiding any nodes not in the third subset, thereby producing a simplified version of the graphical representation comprising: a root node; the nodes from the third subset; and a single path connecting any of the nodes in the third subset to the root node;
  wherein, when two nodes reside on the single path ending at the root node, the node closest to the root node is an ancestor of the other node;
  wherein, when two nodes reside on the single path ending at the root node, the node furthest from the node root is a descendant of the other node; and
  wherein, when two descendant nodes have direct and independent paths to a same ancestor node, the two descendant nodes are siblings of each other.

8. The system as set forth in claim 7, wherein said defined relationship is defined as:
 each node from the secondary set which is the descendant of any node within said first subset; and
 each node from the secondary set which is the ancestor of any node within said first subset.

9. The system as set forth in claim 8 wherein said defined relationship is further defined as: each node from the secondary set which is the sibling of any node within said first subset.

10. The system as set forth in claim 9, wherein said defined relationship is further defined as: each node from the secondary set which is the sibling of the ancestor of any node within said first subset.

11. The system as set forth in claim 7, wherein said defined relationship is defined as: each node from the secondary set which is directly connected to any node within said first subset.

12. The system as set forth in claim 7, wherein said defined relationship is defined as: each node from the secondary set which is directly connected to any two nodes within said first subset.

13. The system as set forth in claim 7, wherein said first subset consists of nodes which are serially connected to form a single path.

14. A non-transitory program storage device readable by a digital processing apparatus and having a program of instructions which are tangibly embodied on said storage device and which are executable by said digital processing apparatus to perform a method of simplifying a graphical representation of a set of connected nodes in a computer-controlled display, said method comprising:
 presenting the set of connected nodes in the computer-controlled display;
 receiving from a user a selection of a first subset of nodes of interest to said user from said set of connected nodes;
 wherein all nodes from the set of connected nodes that are not included in the first subset comprise a secondary set;
 receiving from the user a defined relationship specifying how at least one node in the secondary set is connected to at least one node in said first subset of nodes, wherein said connectedness is a link relationship selected from a group consisting of:
  a) a node in the secondary set which is a descendant of a node in the first subset;
  b) a node in the secondary set which is an ancestor of a node in the first subset;
  c) a node in the secondary set which is a sibling of a node in the first subset; and
  d) a node in the secondary set which is the sibling of the ancestor of a node in the first subset;
 selecting a third subset of nodes from the set of the connected nodes, based on the defined relationship provided by the user, said third subset comprising:
  the nodes in the first subset of nodes;
  at least one node from the secondary set having the defined relationship to the at least one node in the first subset; and
  interconnections among the nodes within the first subset and the at least one node from the secondary set having the defined relationship to the at least one node in said first subset;
 displaying only the third subset of nodes including the interconnections; and hiding any nodes not in the third subset, thereby producing a simplified version of said graphical representation of said set of connected nodes in said computer-controlled display; and wherein the graphical representation comprises a tree structure comprising: a root node; the nodes from the third subset and their interconnections; and a single path connecting any of the nodes in the third subset to the root node.

15. The non-transitory program storage device as set forth in claim 14, wherein, when two nodes reside on the single path ending at the root node, the node which is closest to the root node is an ancestor of the other node;

wherein, when two nodes reside on the single path ending at the root node, the node which is furthest from the node root is a descendant of the other node; and wherein, when two descendant nodes have direct and independent paths to a same ancestor node, the two descendant nodes are siblings of each other.

16. The non-transitory program storage device as set forth in claim 15, wherein said defined relationship is defined as:

each node from the secondary set which is the descendant of any node within said first subset of nodes; and each node from the secondary set which is the ancestor of any node within said first subset of nodes.

17. The non-transitory program storage device as set forth in claim 16, wherein said defined relationship is further defined as: each node from the secondary set which is the sibling of any node within said first subset of nodes.

18. The non-transitory program storage device as set forth in claim 17, wherein said defined relationship is further defined as: each node from the secondary set which is the sibling of the ancestor of any node within said first subset.

19. The non-transitory program storage device as set forth in claim 14, wherein said defined relationship is defined as: each node from the secondary set which is directly connected to any node within said first subset.

20. The non-transitory program storage device as set forth in claim 14, wherein said defined relationship is defined as: each node from the secondary set which is directly connected to any two nodes within said first subset.

21. The non-transitory program storage device as set forth in claim 14, wherein said first subset consists of nodes which are serially connected to form the single path.

* * * * *